Feb. 21, 1961  J. T. FISHER  2,972,656
METER BOX AND REVERSIBLE SHORTING BAR THEREFOR
Filed Jan. 4, 1957  2 Sheets-Sheet 1
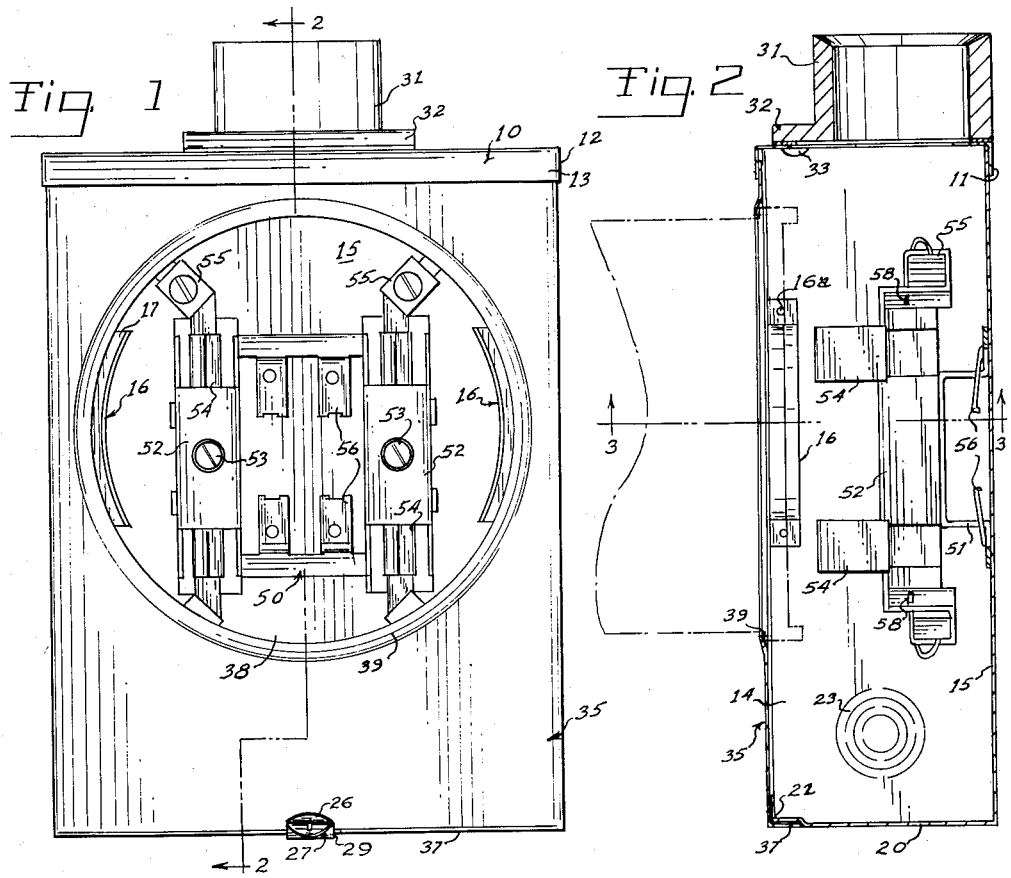
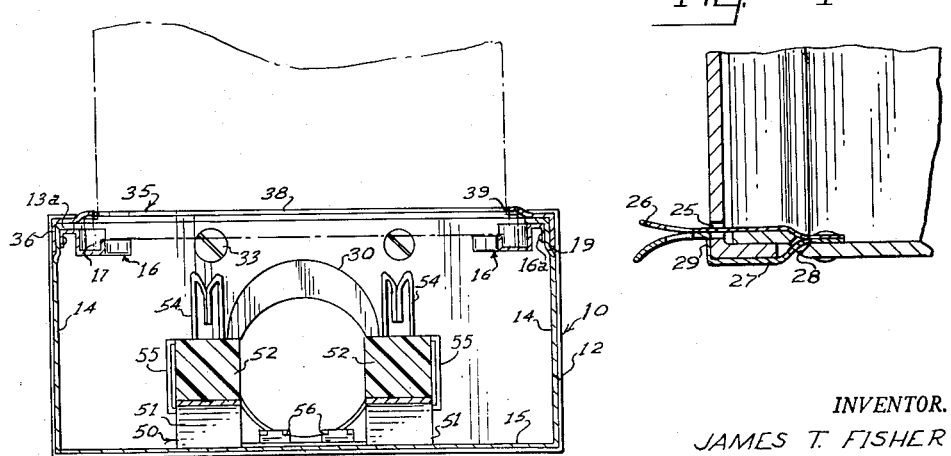
INVENTOR.
JAMES T. FISHER
BY
ATTORNEY Feb. 21, 1961 J. T. FISHER 2,972,656
METER BOX AND REVERSIBLE SHORTING BAR THEREFOR
Filed Jan. 4, 1957 2 Sheets-Sheet 2
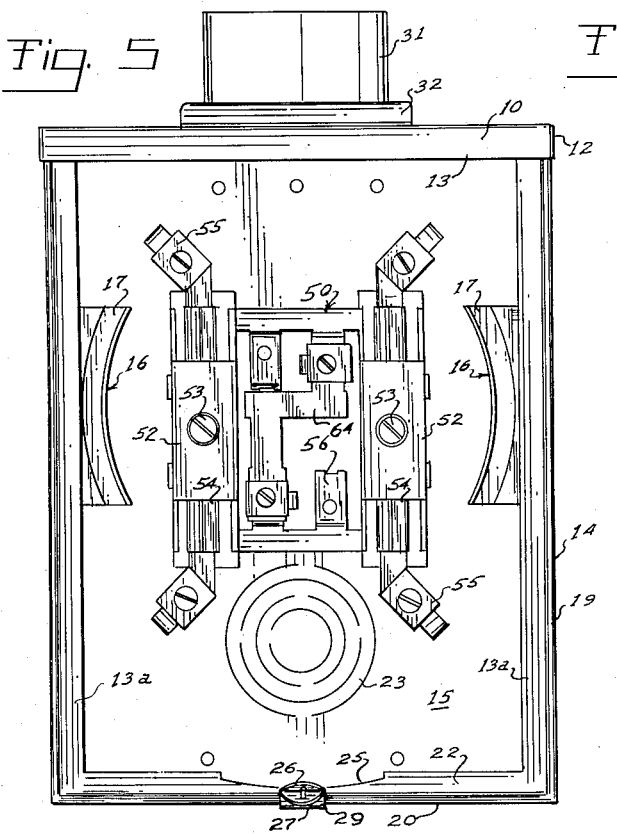
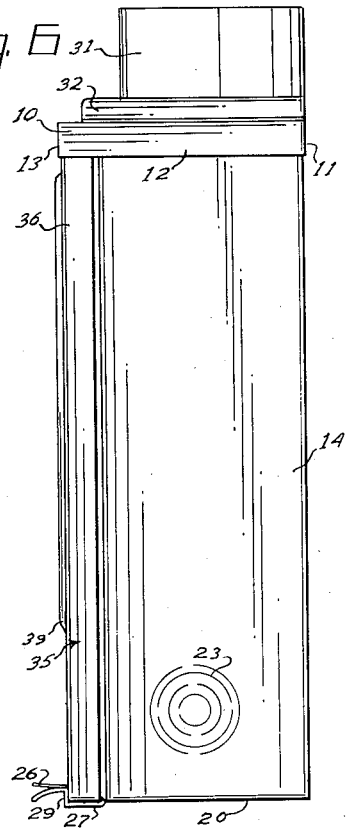
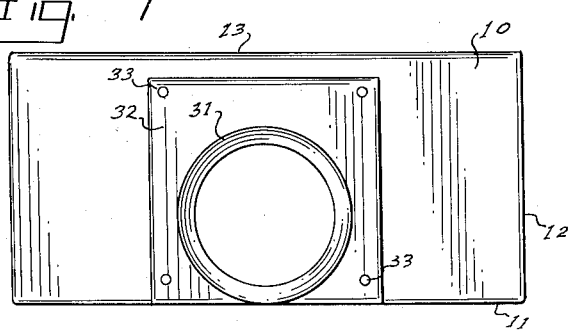
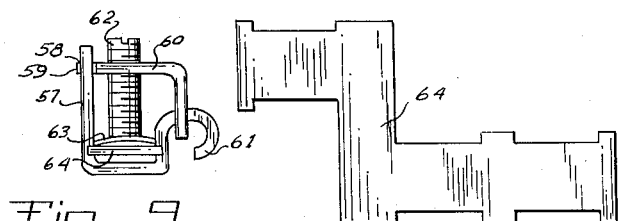
INVENTOR.
JAMES T. FISHER
BY
ATTORNEY

United States Patent Office 2,972,656
Patented Feb. 21, 1961

2,972,656
METER BOX AND REVERSIBLE SHORTING BAR THEREFOR

James T. Fisher, Decatur, Ga., assignor to B & C Metal Stamping Company, Atlanta, Ga., a partnership Filed Jan. 4, 1957, Ser. No. 632,576

4 Claims. (Cl. 174—59)

This invention relates to a meter box, and is particularly concerned with the construction and arrangement of parts which provide in a novel manner, an improved, efficient and effective meter box structure, rugged and durable in construction and well designed to meet the demands of economic manufacture.

In the construction and use of meter boxes, various related problems have arisen which militate against the most effective and efficient mounting, manipulating and servicing of such devices. For instance, difficulties have arisen with respect to the mounting, guiding and securing of a meter in the box in such manner as to be rigidly secured in proper alignment with the inspection aperture of the box. Appropriate grounding has sometimes been difficult to achieve and troublesome in the connection of the ground wires. Conduit hubs have usually been placed in the center of one of the walls of the box and thus spaced from the supporting surface to which the box is attached, requiring undue manipulation of the cables for insertion and removal from the box. The aperture cover plates for the meter boxes have been hard to install and remove, and securing latch means therefor have frequently been cumbersome, ineffective and inefficient as well as so protruding as to preclude the mounting of the box within a confined recess. These and like details of construction and arrangement present related and associated problems which are such as to indicate the desirability of various improved features whereby the meter box as a unit may be vastly improved by the cooperative improvements in its various related features.

It is therefore among the primary objects of the present invention to provide a novel and improved meter box so constructed and arranged as to facilitate installation and servicing while being rugged and durable, yet well adapted to meet the demands of economic manufacture.

Among the more specific objects of the present invention is to provide a novel and improved conduit hub and locating assembly effectively located so as to minimize the difficulty of installing and servicing the box and to permit variations in hub location to accommodate different installation requirements.

Another specific object of the present invention is to provide a connector means by which the grounding of the box, the meter and/or the associated circuits may be more easily accomplished and by which change in circuitry may be readily accomplished.

A further object of the invention is to provide a new and improved cover and cover assembly for a meter box by which the cover may be easily installed and removed and by which the securement of the cover may be attained without such projecting impediments as may limit the installation of the box with respect to confined spaces; the cover and its latching means being operable to assist in retaining the meter in desired position.

Also among the more important specific objects of the invention is to provide a new and improved meter mounting by which the meter may be securely installed and rigidly maintained in the proper position with respect to an apertured cover, the same being simple, effective and efficient while minimizing the structural elements involved, and providing a limit stop for the meter position. This construction also provides for the mounting of a glass cover plate when the meter is removed.

Other objects of the invention relate to the general construction and arrangement of parts, their mounting and interrelated assembly by which the whole structure through interrelation and combination of elements presents a rugged and durable, effective and efficient structure readily mounted and easily connected and serviced.

Numerous other objects, features and advantages of the present invention will be apparent from consideration of the following specification, taken in conjunction with the accompanying drawing, in which:

Fig. 1 is a front elevation of one form of the present invention.

Fig. 2 is a vertical cross-section taken on the line 2—2 of Fig. 1 showing in broken lines the location of the meter.

Fig. 3 is a transverse cross-section taken on the line 3—3 of Fig. 2.

Fig. 4 is a detail view of the front cover latch.

Fig. 5 is a front elevation of the box with the cover removed.

Fig. 6 is a side elevation of the box with the cover in place and secured.

Fig. 7 is a top plan view of the present box.

Fig. 8 is a detail view showing the mounting of a glass cover plate over the meter aperture by resting the peripheral flange thereof in the meter receiving channel.

Fig. 9 is a detail view of one of the connectors of the present invention.

Fig. 10 is a plan view of the grounding bridge of the present device.

While various aspects of the present inventive concept may be variously arranged, designed and combined, that form of the invention here shown by way of illustration may be generally and broadly defined as a meter box comprising a somewhat conventional rectangular enclosure having a removable cover plate, one feature of the invention being the fact that the cover plate may be engaged at its top beneath a depending flange at the front edge of the top of the box while the lower portion is secured by an angled spring latch which is mounted on the bottom wall of the enclosure to positively engage the cover and which cooperates with a companion means which extends through an aperture of the cover so as to leave the side, top and bottom of the box free from protruding securing means which might otherwise limit the mountability to mount the box in a confined space. As will be noted, the latching mechanism provides positive retention of the cover in meter retaining position.

The box itself is characterized by the provision of an elliptical conduit hub opening with respect to which a hub may be located in such manner as to have its rear outer portion flush with the rear wall of the box so that a conduit parallel with and closely adjacent the wall surface to which the box is attached may be directly engaged with the hub. The elliptical hub opening permits variations of this mounting so as to accommodate the hub to various structural demands.

The box is further characterized by the provision of rigidly secured arcuately formed meter engaging brackets so constructed and arranged as to insure arcuate and rigid mounting for the meter. When the meter is removed the brackets are designed to retain a flanged glass cover plate over the meter opening. The brackets also insure proper grounding of the meter.

A further important feature is the provision of a grounding bridge by which various appropriate grounding of the box, meter and/or the circuits associated therewith may be had, thus, rendering the box universally applicable to a multiplicity of various circuit arrangements and designs.

Referring now to the drawings, it will be seen that the box itself which may be formed of a relatively heavy gauge metal, bent and spot welded as by the use of separate stamping for the back and sides and for the top and bottom as here indicated. In general contour, the box is substantially conventional. It is here shown as having a flat flanged top member 10, including depending back and side flanges 11, 12 which extend downwardly therefrom to receive therein the upper edges of the side walls 14 and the back 15 of the body which may be spot welded thereto. The front flange 13 of the top 10 is spaced forwardly of the front edges of the sides to receive the front cover as hereinafter referred to. The body may be formed of a single or separate stamping, the side walls including inwardly directed front flanges 13a.

For receiving and mounting the meter, the flanges 13a mount a pair of oppositely disposed meter mounting channels 16, each including an arcuately formed meter receiving way 17. The channels 16 are secured inwardly of and flush with the inner surface of the front flanges 13a and may be secured as by rivets 16a extending through the forward inwardly directed side terminal shoulders 19 of the sides, which shoulders receive therein the sides of the front cover. The channels 16 will also seat the meter so as to constitute stops precluding too great an entry of its prongs and they provide grounding control. As indicated in Fig. 8 when the meter is removed the flange 21 of a circular glass cover plate may be seated in the ways to close the meter opening of the cover when the cover is in place. The bottom of the box is closed by an upwardly flanged bottom closure 20. The front flange 22 of the bottom 20 extends upwardly in the plane of the side flanges of the body. As indicated at 23, the sides, back and bottom may be provided with the conventional knockout portions by which various arrangements of apertures for the ingress and egress of conductors may be provided for without the necessity of drilling or cutting the material of the box.

For securing the cover in position, the central front portion of the bottom front is pierced as indicated at 25 to receive the forward extension of a flat and generally rigid keeper element 26. A companion angled and apertured keeper 27 extends through an aperture 28 of the front edge of the lower wall and provides a shoulder 29 engaging the angled corner of the lower corner wall to positively retain the cover in closed position. Thus, inadvertent forward movement of the cover is precluded. This arrangement also insures a continuous application of pressure on the meter to insure its proper seating against the channels 16.

For receiving conduit cables within the body, the top 10 is formed with an elliptical opening 30 over which is applied a conduit hub 31 which may be located with the periphery of the rear portion thereof in line with the rear flange of the top. The forward portion of the hub is provided with an extended flange 32 preferably extending to the front flange of the top. The hub base is preferably rectangular and the hub may be secured over the aperture 30 by suitable threaded bolts as indicated at 33. By this arrangement it will be seen that a conduit secured to a wall may be threaded directly into the hub 31 as distinct from such fixtures in which the conduit hub is located directly in the center of the top, and which thus necessitates an outward bending of a wall supported conduit for registration with the hub. It will be noted, however, that by virtue of the elongation of the opening 30 other types of hubs may be located in registration therewith to accommodate other locations of a cable conduit. Such opening also provides for the use of various sized hubs.

The cover 35 of the box body is, like the box itself, preferably formed of substantially rigid metal being stamped to provide side flanges 36 and a bottom flange 37. No flange is provided at the top edge, and thus the top edge of the cover may slide upwardly under the front flange 13 of the top to preclude a lateral displacement of the cover, thus insuring a retention of the cover when the latch is in engaged position. The front face of the cover defines a circular opening 38 surrounded by a bezel flange 39 so as to receive the meter therethrough or to receive a glass closure for the opening when the meter is not in position. As hereinbefore mentioned, the flange 21 of the glass cover may be received in the ways 17 to secure the glass in position behind the opening 38 as seen in Fig. 8.

Mounted within the body and secured to the back wall 15 thereof in any suitable manner in alignment with the aperture of front cover, there is provided a generally conventional meter socket mounting including a skeleton frame type of base constituted by a generally rectangular peripheral frame 50 having upstanding bridge pieces 51 on either side thereof which support parallel insulating pieces 52 which may be secured as by the bolts 53. On either end of each of such blocks there is provided the normal meter socket contact 54 including outwardly projecting connector elements 55. One feature of the present invention is the provision of inwardly extending and generally U-shaped connector receiving or keeper legs 56 extending in parallel pairs inwardly from the upper and lower members of the rectangular frame. The connectors or cable clips used in connection therewith are illustrated in Fig. 9 and comprise generally U-shaped body members, one leg of the U being extending as at 57 and being apertured as at 58 to receive therethrough in pivotal relation the reduced end 59 of a yoke 60, the opposite end of which is apertured to receive therethrough the curved hook end 61 of the member. Threaded through the horizontal portion of the yoke there is provided a screw shank 62 pivoted at the lower end with an arcuate pressure plate 63, the arrangement being such that when the connector is disposed beneath the plate, pressure, as applied by the shank in its rotation, will secure the connector in position and will effect a rigid mounting of the yoke by pressure on the ends thereof.

While the structure here set forth for the socket meter mounting is generally conventional, an important feature of the present invention is the provision of a Z-shaped member or shorting bar 64 indicated in Fig. 10 which will bridge between the upper member on one side and the lower one at the other. The Z member is preferably of copper and is retained in place by being fitted under the pressure plate of the clamp above described. By loosening the clamp, the Z member may be removed and reversed to engage the opposite side of the upper member with the opposite side of the lower member. It is also feasible to provide additional clamping members or cable clips on the central portion 64 of the Z member, and since the Z member is removable it may be readily replaced in the event of damage or wear. By this construction it will be seen that the present socket meter mounting provides a multiplicity of arrangements for the grounding of various types of circuits and for the replacement of the Z member which may be damaged due to wear or excessive voltages.

To clarify the function of the Z-shaped member or shorting bar 64, it perhaps would be of value to consider a typical prior art arrangement. In a conventional three wire metering connection the outer wires are broken and secured to the meter socket jaw connectors, whereas the neutral or ground wire is usually stripped a short length and secured in a cable clip on the back wall of the meter box so as to ground it thereto for safety purposes. It is apparent, however, that conventional single grounding arrangements are unsatisfactory in multiple wire systems where more than one ground or neutral wire must pass through the meter box, or where a branch ground line is required at either the input or output side of the meter box. The present invention readily permits such circuit arrangements, however, by the provision of a plurality of spaced grounding terminals. To provide for the termination or origination of an additional neutral or ground line, a copper or otherwise highly conductive shorting bar is removably connected between an input and output grounding clamp. This permits one ground or neutral wire to pass straight through the meter box, being grounded to the meter box at an intermediate point by a grounding clip on either the input or output end member of the socket supporting frame. The Z-shaped shorting bar may then be utilized to connect a second grounding clip to the initial grounding clip, thereby bypassing the relatively high resistance socket jaw frame. An additional ground or neutral wire may then be connected to this second grounding clip, so as to permit additional ground wire to either originate or terminate at the meter box in accordance with circuit requirements.

From the foregoing it will be seen that the present invention provides a rugged and durable structure embodying advanced features with respect to the cover and its securement, and with respect to the mounting and replacement of the meter which is retained in proper alignment by the ways provided in the arcuate members on each side of the body. It will also be seen that an improved outlet arrangement is provided by which various types of lead-in cables and conduits may be accommodated, and a further important feature is the provision of the novel skeletal socket meter frame as well as the bridging member which may be readily relocated to provide for a multiplicity of circuit arrangements. In the construction of the device it will be understood that the invention is not limited or confined to specific structural details herein set forth but that numerous changes, modifications and the full use of equivalents may be resorted to in the practice of the invention without departing from the spirit or scope of the invention as defined in the appended claims.

I claim:

1. In a plug-in meter fixture including a skeletal frame having side bridges, insulation blocks on said bridges, plug-in meter socket contacts on each of said blocks, and parallel top and bottom bars joining said bridges, the combination of a pair of connector receiving legs on each of said bars and a highly conductive removable shorting bar interconnecting the leg at one side of one bar with the leg at the opposite side of the opposite bar.

2. In a plug-in meter fixture including a skeletal frame having side bridges, insulation blocks on said side bridges, plug-in meter socket contacts on each of said blocks, and parallel top and bottom bars joining said bridges, the combination of a pair of connector receiving legs on each of said bars, and a highly conductive removable shorting bar interconnecting the leg at one side of one bar with the leg at the opposite side of the opposite bar, said shorting bar being reversible to interconnect the other pair of legs.

3. In a plug-in meter fixture including a skeletal frame having side bridges, insulation blocks on said side bridges, plug-in meter socket contacts on each of said blocks, and parallel top and bottom bars joining said bridges, the combination of a pair of connector receiving legs on each of said bars, and a highly conductive removable shorting bar interconnecting the leg at one side of one bar with the leg at the opposite side of the opposite bar, said shorting bar being reversible to interconnect the other pair of legs, and a plurality of conductor connectors detachably mounted on said bar, at least two of said connectors releasably securing said bar to the legs which it interconnects.

4. In a meter socket box having a back wall, a generally rectangular metal frame secured to said back wall so as to be in electrical contact therewith, said frame having side members and end members, an insulating block on each of said side members, and a pair of meter socket jaws on each insulating block, the combination of first and second spaced parallel keeper legs extending normally from one of said end members, first and second spaced parallel keeper legs extending normally from the other of said end members, a first cable grounding clip retained by said first keeper leg of said one end member, a second cable grounding clip retained by said second keeper leg of said other end member, and a highly conductive bar removably secured diagonally between said first and second cable grounding clips.

References Cited in the file of this patent

UNITED STATES PATENTS

| | | |
|---|---|---|
| 1,275,083 | Orth | Aug. 6, 1918 |
| 2,059,283 | Saar | Nov. 3, 1936 |
| 2,145,557 | Rypinski | Jan. 31, 1939 |
| 2,534,449 | Johansson | Dec. 19, 1950 |
| 2,691,693 | Lewis | Oct. 12, 1954 |
| 2,695,923 | Lajeunesse et al. | Nov. 30, 1954 |

FOREIGN PATENTS

| | | |
|---|---|---|
| 19,690 | Great Britain | 1906 |